(12) United States Patent
Hakushima et al.

(10) Patent No.: US 12,040,639 B2
(45) Date of Patent: Jul. 16, 2024

(54) POWER SUPPLY DEVICE AND CONTROL METHOD

(71) Applicant: DENSO TEN Limited, Kobe (JP)

(72) Inventors: Daiki Hakushima, Kobe (JP); Takeshi Matsumoto, Kobe (JP); Hiroshi Matsumoto, Kobe (JP); Keiichi Yonezaki, Kobe (JP); Ryuki Maeda, Kobe (JP)

(73) Assignee: DENSO TEN LIMITED, Kobe (JP)

( * ) Notice: Subject to any disclaimer, the term of this patent is extended or adjusted under 35 U.S.C. 154(b) by 396 days.

(21) Appl. No.: 17/478,741

(22) Filed: Sep. 17, 2021

(65) Prior Publication Data
US 2022/0263323 A1 Aug. 18, 2022

(30) Foreign Application Priority Data

Feb. 16, 2021 (JP) ................................. 2021-022398

(51) Int. Cl.
H02J 7/00 (2006.01)
B60R 16/033 (2006.01)
H02J 7/34 (2006.01)

(52) U.S. Cl.
CPC .......... H02J 7/0024 (2013.01); B60R 16/033 (2013.01); H02J 7/00304 (2020.01); H02J 7/34 (2013.01)

(58) Field of Classification Search
CPC ......... H02J 7/0024; H02J 7/00304; H02J 7/34
USPC .......................................................... 320/117
See application file for complete search history.

(56) References Cited

U.S. PATENT DOCUMENTS

| | | | |
|---|---|---|---|
| 2017/0080883 A1* | 3/2017 | Yasunori | H02J 7/007182 |
| 2018/0041048 A1* | 2/2018 | Yang | B60R 16/03 |
| 2019/0071039 A1* | 3/2019 | Tsukamoto | H02J 7/00304 |
| 2022/0311270 A1* | 9/2022 | Hashiga | H02J 7/0024 |
| 2023/0307906 A1* | 9/2023 | Hanaoka | H02J 7/342 |

FOREIGN PATENT DOCUMENTS

JP 2017-061240 A 3/2017

* cited by examiner

Primary Examiner — Nathaniel R Pelton
(74) Attorney, Agent, or Firm — Oliff PLC

(57) ABSTRACT

A power supply device includes: a first system connected to a first load; a second system connected to a second load; an inter-system switch configured to connect and disconnect the first system and the second system to and from each other; a controller configured to normally supply power of a first power supply to the first system and the second system and, in response to a fault of the first system being detected, turn off the inter-system switch to supply power of a second power supply to the second system; and a backup circuit which includes a discharge regulation unit configured to regulate discharging of the second power supply.

7 Claims, 14 Drawing Sheets

POWER SUPPLY DEVICE AND CONTROL METHOD

CROSS-REFERENCE TO RELATED APPLICATIONS

This application is based on and claims priorities under 35 USC 119 from Japanese Patent Application No. 2021-022398 filed on Feb. 16, 2021, the content of which is incorporated herein by reference.

TECHNICAL FIELD

Embodiments of this disclosure relate to a power supply device and a control method.

BACKGROUND ART

In the related art, there has been a redundant power supply system which has a first power supply and a second power supply so as to supply power to on-board equipment (loads) by one of power supply systems if a ground fault occurs in the other power supply system, such that even if a power supply fault occurs when the vehicle is running, the redundant power supply system enables the vehicle to perform evacuation travel to a safe place and to stop there.

The redundant power supply system has a first system which is connected to a first load, a second system which is connected to a second load having the same function as the first load has, and an inter-system switch capable of connecting and disconnecting the first system and the second system to and from each other (see JP-A-2017-61240 for instance).

The redundant power supply system normally keeps the inter-system switch in the ON state to supply power from the first power supply to the first load and the second load. Further, if a power supply fault such as a ground fault occurs in the first system, the redundant power supply system turns off the inter-system switch to supply power from the second power supply to the second load, thereby performing backup control.

In addition, for backup control using the second power supply, in normal states, it is desirable that the redundant power supply system should suppress discharging of the second power supply. The reason is that if the voltage of the second power supply drops, backup control cannot be carried out for sufficient time. For this reason, in normal states, the second power supply is disconnected from the second system, and if a power supply fault occurs in the first system, backup control is performed by connecting the second power supply to the second system.

SUMMARY OF INVENTION

However, in the redundant power supply system, if a power supply fault occurs in the first system, after the inter-system switch is turned off, supply of power to the second load may be instantaneously interrupted until the second power supply is connected to the second system.

An aspect of embodiments was made in view of this circumstances, and an object thereof is to provide a power supply device and a control method capable of restraining supply of power to a second load from being instantaneously interrupted when a power supply fault occurs in a first system while restraining a second power supply from being discharged in normal states.

A power supply device according to an aspect of the embodiments includes: a first system connected to a first load; a second system connected to a second load; an inter-system switch configured to connect and disconnect the first system and the second system to and from each other; a controller configured to normally supply power of a first power supply to the first system and the second system and, in response to a fault of the first system being detected, turn off the inter-system switch to supply power of a second power supply to the second system; and a backup circuit which includes a discharge regulation unit configured to regulate discharging of the second power supply.

The power supply device and the control method according to the aspect of the embodiments have the effect of being able to restrain supply of power to the second load from being instantaneously interrupted when a power supply fault occurs in the first system while restraining the second power supply from being discharged in normal states.

DESCRIPTION OF EMBODIMENTS

Hereinafter, embodiments of a power supply device and a control method will be described in detail with reference to the accompanying drawings. However, the present invention is not limited by the following embodiments. Hereinafter, power supply devices mounted on vehicles having an automatic drive function in order to supply power to loads will be described as examples. However, the power devices according to the embodiments can also be mounted on vehicles having no automatic drive function.

[1. Configuration of Power Supply Device]

Figure 1:
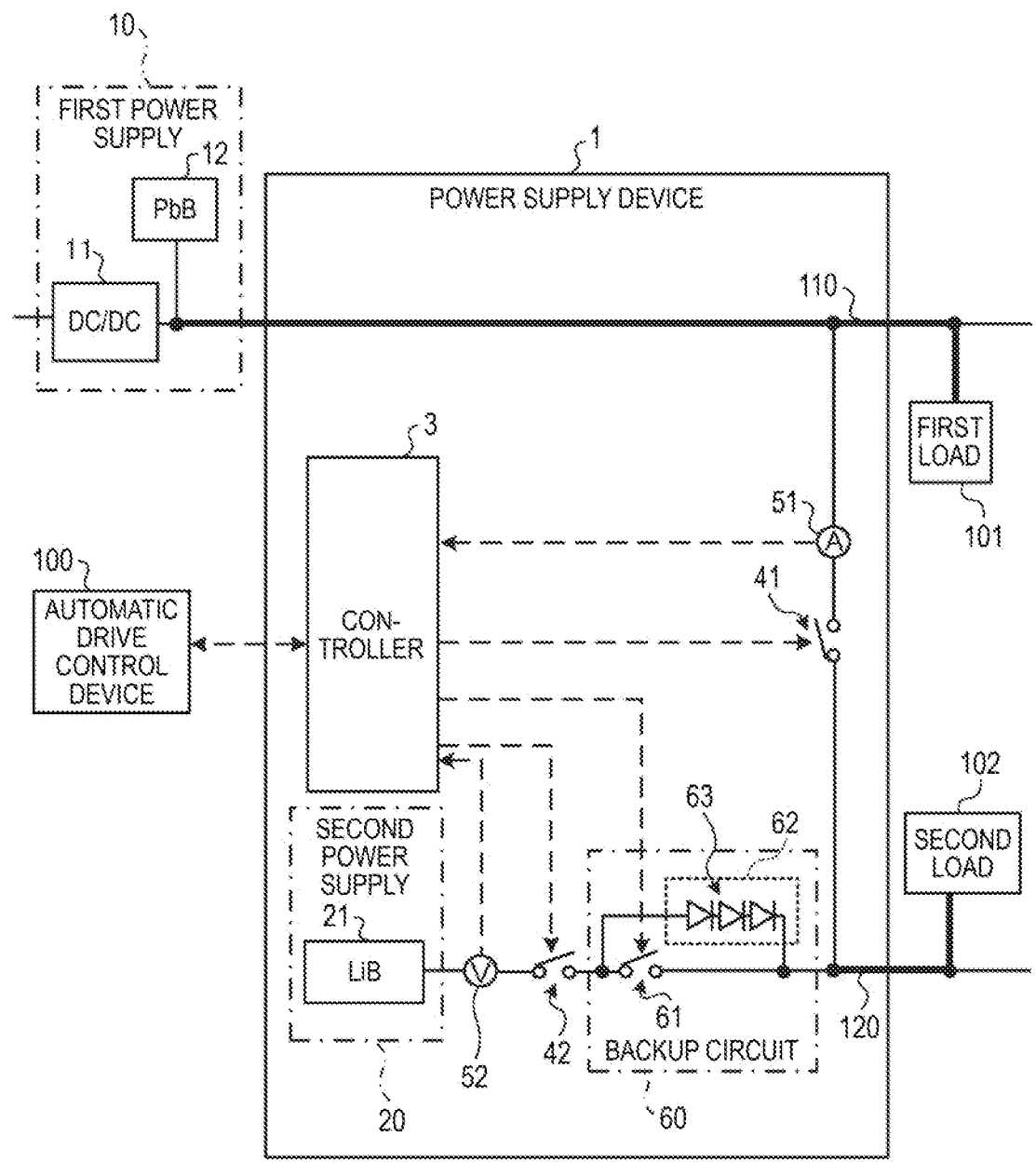
FIG. 1 is an explanatory view illustrating a configuration example of a power supply device according to an embodiment.

As shown in FIG. 1, a power supply device 1 according to an embodiment is connected to a first power supply 10, a first load 101, a second load 102, and an automatic drive control device 100. The power supply device 1 includes a first system 110 which is connected to the first load 101, and a second system 120 which is connected to the second load 102.

The first load 101 and the second load 102 include loads for automatic drive. For example, the first load 101 includes a steering motor, an electric brake device, onboard cameras, radars, and so on which operate during automatic drive. Also, the first load 101 includes general loads such as a display, an air conditioner, an audio system, a video system, and various lights.

The second load 102 includes at least devices which operate during automatic drive, such as a steering motor, an electric brake device, onboard cameras, and radars. The first load 101 and the second load 102 are operated by power which is supplied from the power supply device 1. The automatic drive control device 100 is a device for performing automatic drive control on the vehicle by operating the first load 101 and the second load 102.

The first power supply 10 includes a DC-to-DC converter (hereinafter, referred to as the "DC/DC 11"), and a lead battery (hereinafter, referred to as the "PbB 12"). However, a battery for the first power supply 10 may be an arbitrary secondary battery other than the PbB 12.

The DC/DC 11 is connected to a power generator for generating power by converting the regenerative energy of the vehicle to electricity, and a high-voltage battery (not shown in the drawings) having a voltage higher than the voltage of the PbB 12, lowers the voltages of the power generator and the high-voltage battery, and outputs them to the first system. The high-voltage battery is, for example, a vehicle driving battery that is mountable on electric automobiles or hybrid automobiles. In the case where the vehicle has an engine, the power generator may be an alternator for generating power by converting the torque of the engine to electricity. The DC/DC 11 performs charging of the PbB 12, supply of power to the first load 101, supply of power to the second load 102, and charging of a second power supply 20 (to be described below).

The power supply device 1 includes the second power supply 20, an inter-system switch 41, a battery switch 42, a controller 3, and a backup circuit 60. Further, the power supply device 1 includes a current sensor 51 and a voltage sensor 52.

The second power supply 20 is a backup power supply for the case where supply of power by the first power supply 10 becomes impossible. The second power supply 20 includes a lithium-ion battery (hereinafter, referred to as the "LiB 21"). A battery for the second power supply 20 may be an arbitrary secondary battery other than the LiB 21.

The inter-system switch 41 is connected so as to be able to connect and disconnect the first system 110 and the second system 120 to and from each other. The battery switch 42 is connected so as to be able to connect and disconnect the LiB 21 and the backup circuit 60 to and from each other. The backup circuit 60 includes a regulation switch 61 and a discharge regulation unit 62.

The regulation switch 61 is connected between the battery switch 42 and the contact point of the inter-system switch 41 and the second load 102. The discharge regulation unit 62 is connected in parallel to the regulation switch 61. The discharge regulation unit 62 is composed of a plurality of (herein, three) rectifier elements (diodes) 63 connected in series. The anode of the discharge regulation unit 62 is connected to the LiB 21 through the battery switch 42, and the cathode thereof is connected to the inter-system switch 41 and the second load 102.

Between the inter-system switch 41 and the first system 110, the current sensor 51 is connected. The current sensor 51 may be connected between the inter-system switch 41 and the second system 120. The current sensor 51 detects the current value of current flowing through the inter-system switch 41, and outputs the detection result to the controller 3. Between the second power supply 20 and the battery switch 42, the voltage sensor 52 is connected. The voltage sensor 52 detects the voltage value of the LiB 21, and outputs the detection result to the controller 3.

The controller 3 includes a microcomputer having a central processing unit (CPU), a read only memory (ROM), a random access memory (RAM), and so on, and various circuits. However, the controller 3 may be configured with hardware such as application specific integrated circuit (ASIC) and a field programmable gate array (FPGA).

The CPU executes programs stored in the ROM, using the RAM as a work area, whereby the controller 3 controls the operation of the power supply device 1. The controller 3 controls the ON/OFF states of the inter-system switch 41, the battery switch 42, and the regulation switch 61, on the basis of the detection result input from the current sensor 51, thereby supplying power from the first power supply 10 or the second power supply 20 to the first load 101 and the second load 102.

Further, the controller 3 controls the ON/OFF states of the battery switch 42 and the regulation switch 61, on the basis of the detection result input from the voltage sensor 52, thereby controlling charging of the LiB 21 with power which is supplied from the first power supply 10.

In a case where a power supply fault occurs in one system of the first system 110 and the second system 120, the controller 3 supplies power to the loads by the other system. In this way, the power supply device 1 enables the automatic drive control device 100 to drive the vehicle to a safe place for evacuation and stop the vehicle.

Now, the operation of the power supply device 1 will be described with reference to FIG. 2 to FIG. 5. In FIG. 2 to FIG. 5, in order to facilitate understanding of the operation of the power supply device 1, the controller 3, the current sensor 51, and the voltage sensor 52 are not shown.

[2. Normal Operation of Power Supply Device]

Figure 2:
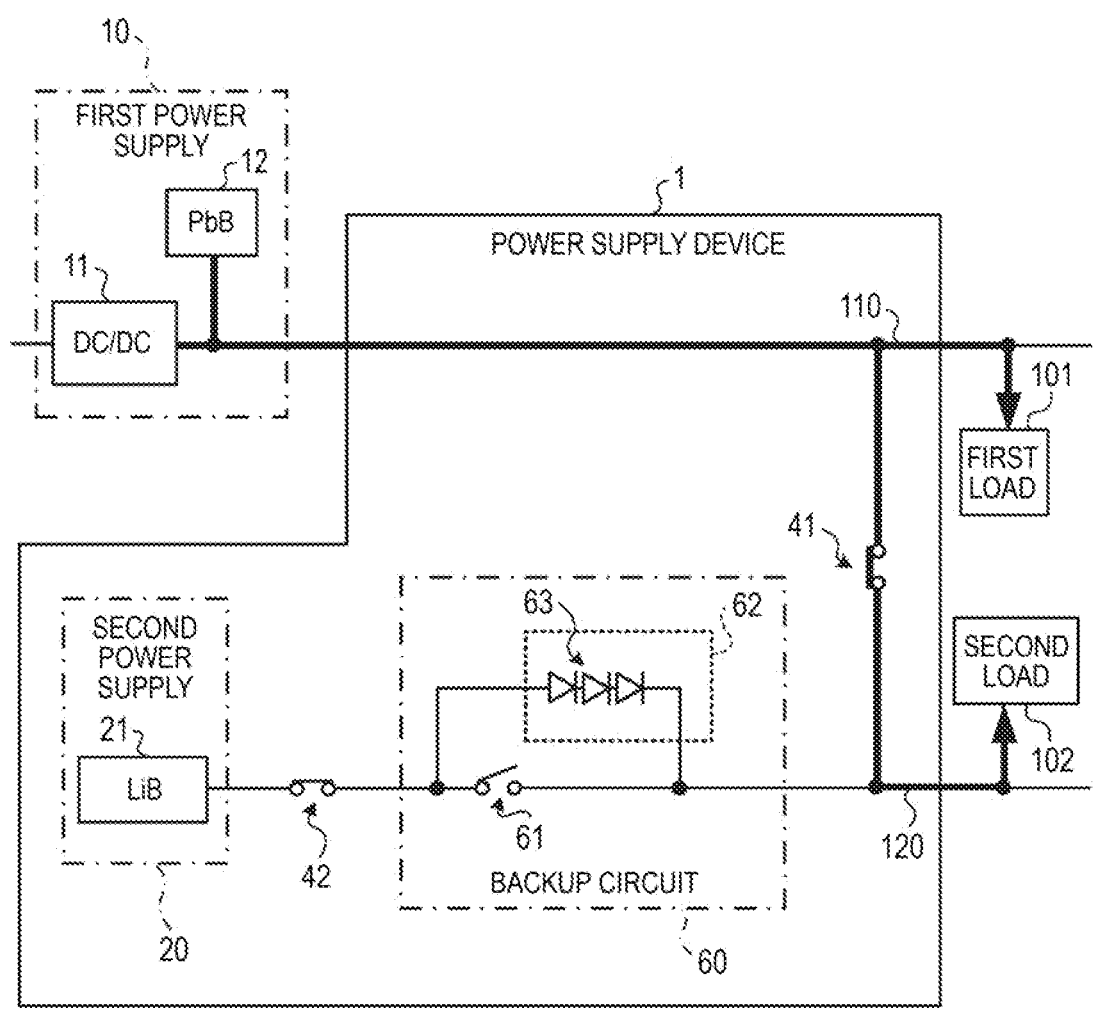
FIG. 2 is an explanatory view illustrating an operation example of the power supply device according to the embodiment.

In a normal state where there is no power supply fault such as a ground fault in the first system 110, the controller 3 keeps the inter-system switch 41 in the ON state, keeps the battery switch 42 in the ON state, and keeps the regulation switch 61 in the OFF state, as shown in FIG. 2, such that power is supplied from the first power supply 10 to the first load 101 and the second load 102.

At this time, since the battery switch 42 is conductive, the current pathway from the LiB 21 to the second load 102 through the battery switch 42 and the discharge regulation unit 62 is formed. However, between the battery switch 42 and the second load 102, there is a potential difference corresponding to three diode drops of the discharge regulation unit 62. In other words, when the voltage of the cathode of the discharge regulation unit 62 becomes lower than the voltage of the LiB 21 by the potential corresponding to the diode drops, or more, the discharge regulation unit 62 goes into a conductive state.

Therefore, the discharge regulation unit 62 can prevent the power of the second power supply 20 from being unnecessarily discharged from the backup circuit 60, for example, when the voltage of the first power supply 10 is equal to the voltage of the second power supply 20. Specifically; when the voltage of the first power supply 10 is equal to the voltage of the second power supply 20, since the discharge regulation unit 62 is not conductive, the power of the second power supply 20 is not discharged. Further, although the voltage of the first power supply 10 may change due to driving of the first load 101 and the second load 102 in normal states, even if such a voltage change occurs, the discharge regulation unit 62 does not go into the conductive state unless the voltage of the first power supply 10 becomes lower than the voltage of the second power supply 20 by the potential corresponding to the diode drops, or more. In this way, the discharge regulation unit 62 regulates discharging of the second power supply 20 during the normal operation of the power supply device 1. In addition, the number of diodes 63 in the discharge regulation unit 62 needs only to be set to prevent the discharge regulation unit 62 from going into the conductive state due to the difference between the maximum voltage of the first power supply 10 and the maximum voltage of the second power supply 20, or a voltage drop attributable to a change in the voltage of the first power supply 10 assumable during a normal state.

[3. Operation of Power Supply Device During Charging]

During the normal operation shown in FIG. 2, the controller 3 monitors the voltage value of the LiB 21 on the basis of the detection result of the voltage sensor 52 (see FIG. 1). In a case where the voltage value of the LiB 21 becomes smaller than a lower limit of voltage value at which a backup operation is possible, and the controller determines that it is impossible to complete a predetermined backup operation by supplying power from the second power supply 20 to the second load 102, the controller 3 starts charging the second power supply 20.

Figure 3:
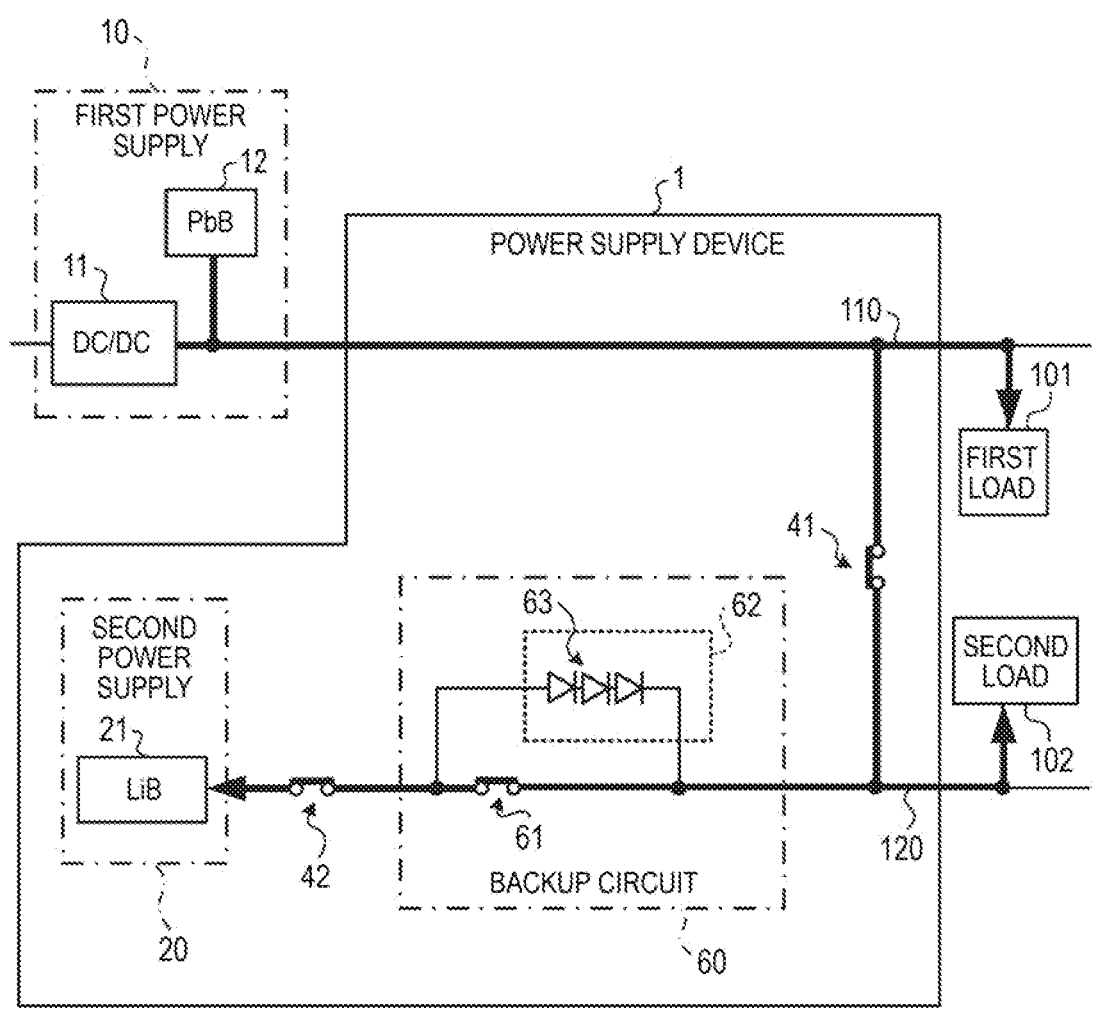
FIG. 3 is an explanatory view illustrating another operation example of the power supply device according to the embodiment.

For example, in a case where the voltage value of the LiB 21 becomes smaller than a charge threshold, the controller 3 turns on the regulation switch 61 as shown in FIG. 3. At this time, the inter-system switch 41 and the battery switch 42 are kept in the conductive state.

As a result, while keeping supplying power from the first power supply 10 to the first load 101 and the second load 102, the power supply device 1 can supply power from the first power supply 10 to the LiB 21 through the inter-system switch 41, the regulation switch 61, and the battery switch 42 to charge the second power supply 20.

Also, according to the power supply device 1, it is possible to charge the second power supply 20 in a case where the voltage of the second power supply 20 drops while preventing the second power supply 20 from being discharged unnecessarily by the diodes 63 of the discharge regulation unit 62 during the normal operation. Thereafter, in a case where the voltage value of the LiB 21 becomes equal to or larger than the charge threshold, the controller 3 turns off the regulation switch 61, thereby ending the charging of the second power supply 20, and returns to the normal operation shown in FIG. 2.

[4. Operation of Power Supply Device During First-System Ground Fault]

In the power supply device 1, during the normal operation, a ground fault which is an example of power supply faults may occur in the first system 110. In the example shown in FIG. 4, a ground fault 200 occurs in the first system 110.

The controller 13 monitors the current value of current flowing through the inter-system switch 41, on the basis of the detection result of the current sensor 51 (see FIG. 1). When the current value of current flowing through the inter-system switch 41 is an overcurrent exceeding a ground fault threshold, the controller 3 detects that any ground fault has occurred in the first system 110 or the second system 120.

Further, when the overcurrent flows from the second system 120 to the first system 110, the controller 3 determines that it is a ground fault 200 of the first system 110. Meanwhile, when the overcurrent flows from the first system 110 to the second system 120, the controller 3 determines that it is a ground fault of the second system 120.

In a case where a ground fault 200 occurs in the first system 110, current flows to the ground fault point, so it is impossible to supply power to the first load 101 and the second load 102. For this reason, the power supply device 1 needs to perform backup control by turning off the inter-system switch 41 to supply power from the second power supply 20 to the second load 102.

In this case, a general power supply device having no backup circuit 60 turns off the inter-system switch 41 after a ground fault 200 occurs in the first system 110. By the way, in order to restrain the second power supply 20 from being discharged in normal states, it is required to keep the battery switch 42 in the OFF state in normal states. For this reason, after the inter-system switch is turned off, the battery switch 42 is turned on. Therefore, after the inter-system switch 41 is turned off, supply of power to the second load 102 may be instantaneously interrupted until the battery switch 42 is turned on.

For this reason, the power supply device 1 according to the embodiment includes the discharge regulation unit 62. As described above, during the normal operation, since the voltage of the first power supply 10 approximately equal to the voltage of the second power supply 20 is applied to the cathode of the discharge regulation unit 62, the discharge regulation unit does not allow current to flow to the second load 102. However, in a case where a ground fault 200 occurs in the first system 110, and the inter-system switch 41 is turned off, the voltage of the first power supply 10 is not applied to the discharge regulation unit 62, so the voltage of the cathode becomes lower than the voltage of the second power supply 20 by the voltage corresponding to the diode drops, or more. Then, naturally, the discharge regulation unit starts supply of power to the second load 102 as shown in FIG. 4.

In other words, at the moment when the inter-system switch 41 is turned off, the discharge regulation unit 62 goes into the conductive state to start supply of power to the second load 102. When a ground fault occurs in the first system, the voltage of the cathode of the discharge regulation unit 62 drops even before the inter-system switch 41 is turned off, and there may be a case that, strictly speaking, the discharge regulation unit 62 goes into the conductive state due to a voltage difference corresponding to the diode drops. In this case, the current flowing through the discharge regulation unit 62 flows to the ground fault point 200 through the inter-system switch 41. However, since the inter-system switch 41 is turned off before the voltage of the first power supply 10 drops to 0, even if the discharge regulation unit 62 is conductive until the inter-system switch 41 is turned off, supply of power to the second load 102 is not instantaneously interrupted. Therefore, after turning off the inter-system switch 41, it is possible to surely and immediately supply power to the second load 102 through the discharge regulation unit 62.

Figure 4:
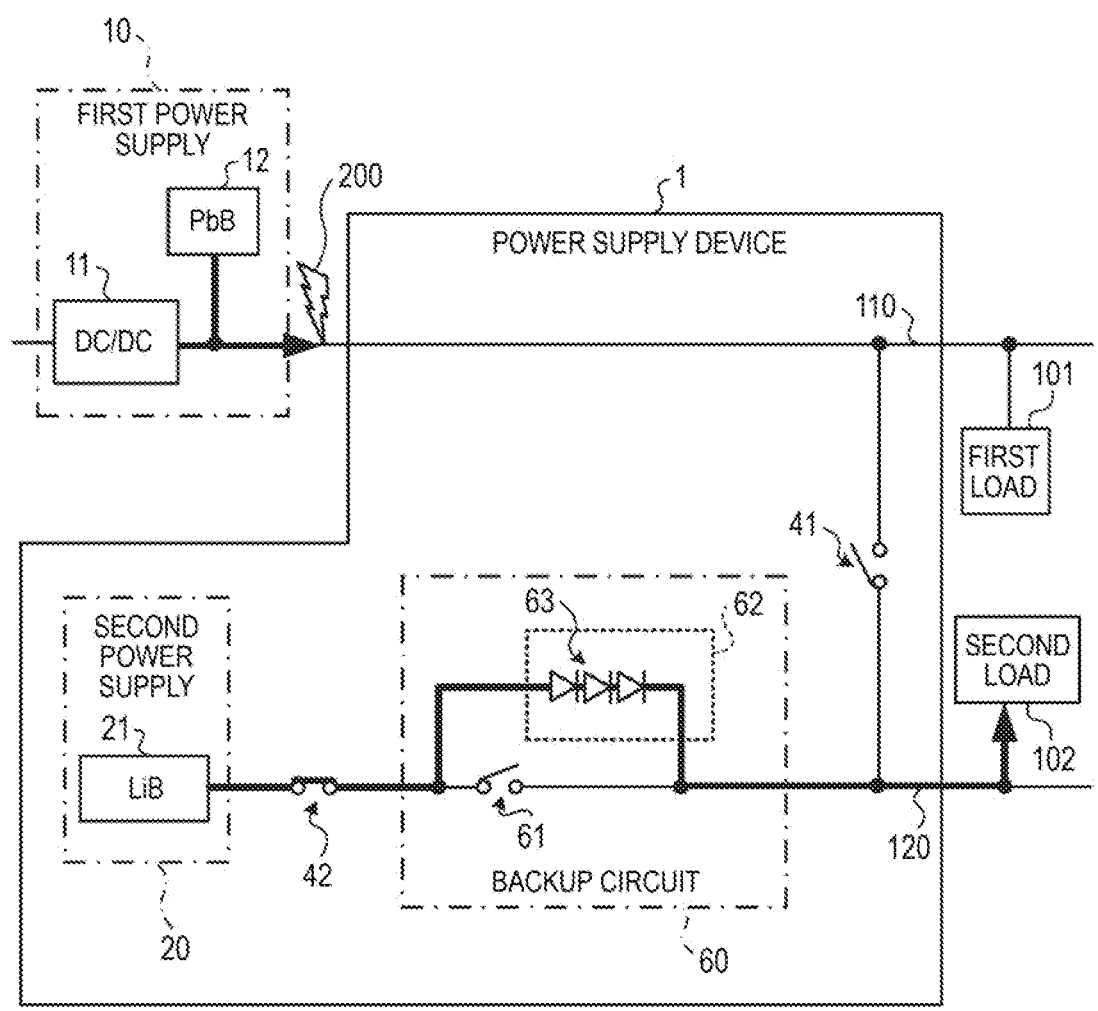
FIG. 4 is an explanatory view illustrating another operation example of the power supply device according to the embodiment.

In this way, in a case where a ground fault 200 occurs in the first system 110, as shown in FIG. 4, the power supply device 1 can supply power from the LiB 21 to the second load 102 through the battery switch 42 and the discharge regulation unit 62 as soon as the inter-system switch 41 is turned off. Therefore, the power supply device 1 can restrain supply of power to the second load 102 from being instantaneously interrupted when a power supply fault occurs in the first system 110. After that, the power supply device 1 performs a backup operation.

[5. Backup Operation of Power Supply Device During First-System Ground Fault]

Figure 5:
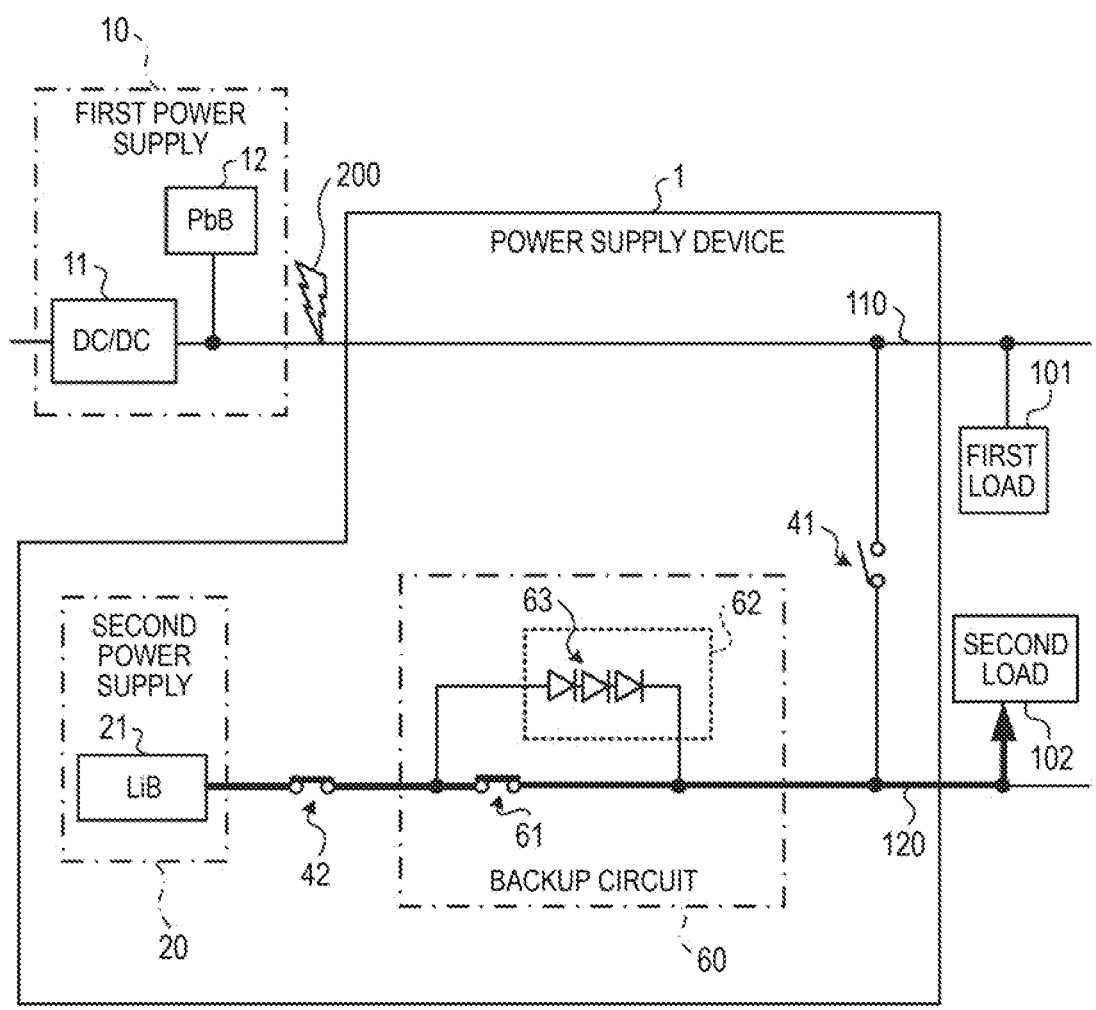
FIG. 5 is an explanatory view illustrating another operation example of the power supply device according to the embodiment.

After performing a ground fault detecting operation, the controller 3 turns off the inter-system switch 41, and then turns on the regulation switch 61, as shown in FIG. 5, to perform a backup operation. As a result, the power supply device 1 supplies power having a voltage higher than that in the ground fault detecting operation, from the second power supply 20 to the second load 102.

As described above, after preventing instantaneous interruption of supply of power to the second load 102 by supplying power through the diodes 63, the power supply device 1 can drive the second load 102 with sufficient power by supplying power without passing the power through the diodes 63.

As a result, the automatic drive control device 100 (FIG. 1) enables the vehicle to perform evacuation travel using the second load 102. Meanwhile, in a case where a ground fault in the second system 120 is detected, the controller 3 turns off the battery switch 42 while turning off the inter-system switch 41, to supply power from the first power supply 10 to the first load 101, thereby enabling the vehicle to perform evacuation travel.

[6. Processing which is Performed by Controller]

Now, processing performed by the controller 3 of the power supply device 1 according to the embodiment will be described with reference to FIG. 6. The controller 3 repeatedly performs the processing shown in FIG. 6 while power is supplied to the vehicle.

Figure 6:
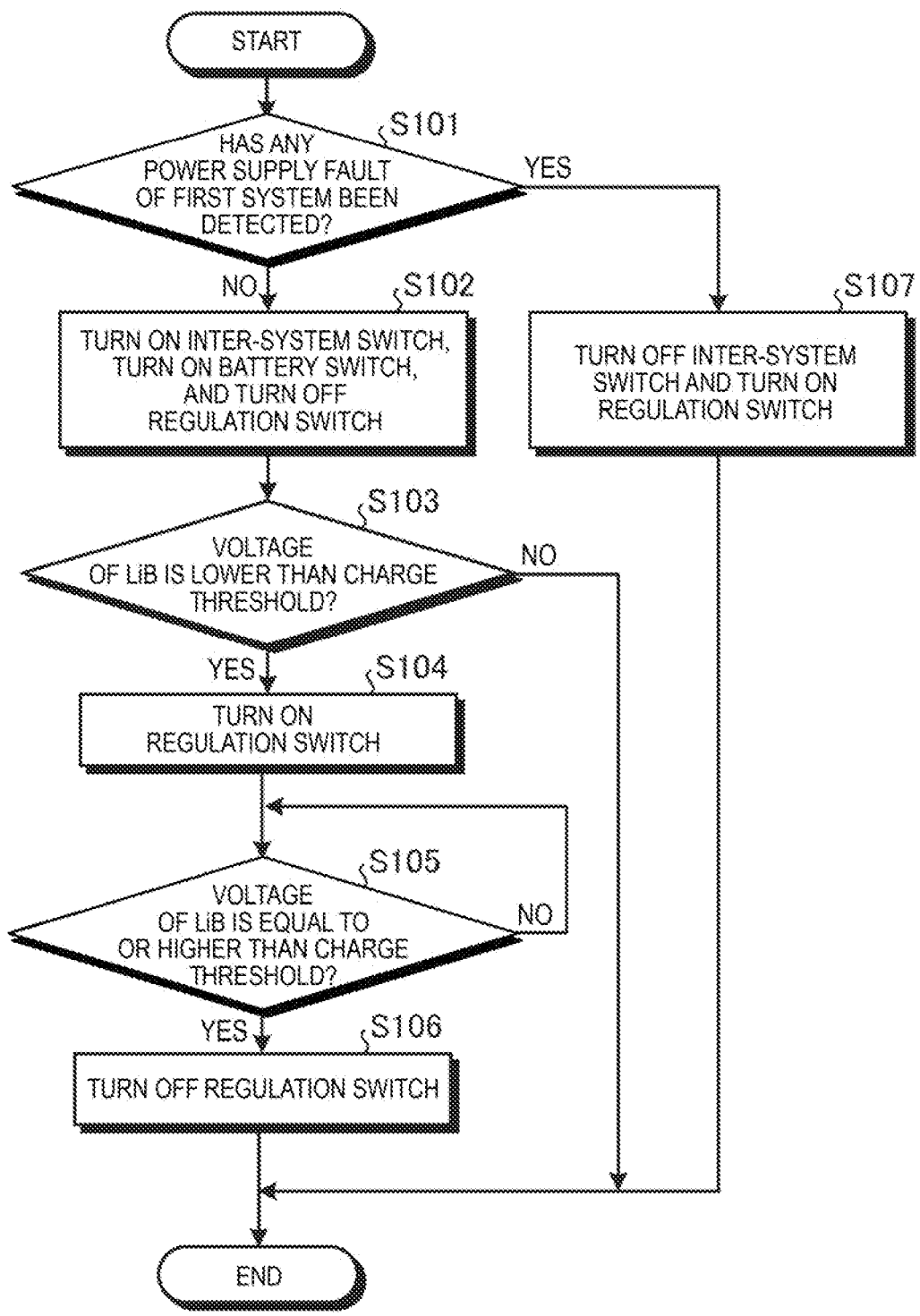
FIG. 6 is a flow chart illustrating an example of processing which is performed by a controller of the power supply device according to the embodiment.

As shown in FIG. 6, first, the controller 3 determines whether any power supply fault of the first system 110 has been detected or not (STEP S101). When determining that a power supply fault of the first system 110 has been detected ("Yes" in STEP S101), the controller 3 turns off the inter-system switch 41, turns on the regulation switch 61 (STEP S107), and ends the processing. Then, the controller 3 restarts the processing from the STEP S101.

Meanwhile, when determining that any power supply fault of the first system 110 has not been detected ("No" in STEP S101), the controller 3 turns on the inter-system switch 41, turns on the battery switch 42, and turns off the regulation switch 61 (STEP S102).

Subsequently, the controller 3 determines whether the voltage of the LiB 21 is lower than the charge threshold, or not (STEP S103). When determining that the voltage of the LiB 21 is equal to or higher than the charge threshold ("No" in STEP S103), the controller 3 ends the processing. Then, the controller 3 restarts the processing from STEP S101.

When determining that the voltage of the LiB 21 is lower than the charge threshold ("Yes" in STEP S103), the controller 3 turns on the regulation switch 61 (STEP S104) to start charging of the LiB 21.

Subsequently, the controller 3 determines whether the voltage of the LiB 21 has become equal to or higher than the charge threshold, or not (STEP S105). When determining that the voltage of the LiB 21 has not become equal to or higher than the charge threshold ("No" in STEP S105), the controller 3 repeats the determining process of STEP S105 until the voltage of the LiB 21 becomes equal to or higher than the charge threshold.

Then, when determining that the voltage of the LiB 21 has become equal to or higher than the charge threshold ("Yes" in STEP S105), the controller 3 turns off the regulation switch 61 (STEP S106), and ends the processing. Then, the controller 3 restarts the processing from STEP S101.

[7. Configuration of Power Supply Device According to First Modification]

Now, a power supply device 1a according to a first modification will be described with reference to FIG. 7. Herein, of the components shown in FIG. 7, components identical to the components shown in FIG. 1 are denoted by the same reference symbols as the reference symbols shown in FIG. 1, and a repetitive description thereof will not be made. The embodiment shown in FIG. 1 is an example of a system in which the voltage of the first power supply 10 is equal to the voltage of the second power supply 20, but the first modification is an example of a system in which the voltage of the second power supply 20 is lower than the voltage of the first power supply 10.

Figure 7:
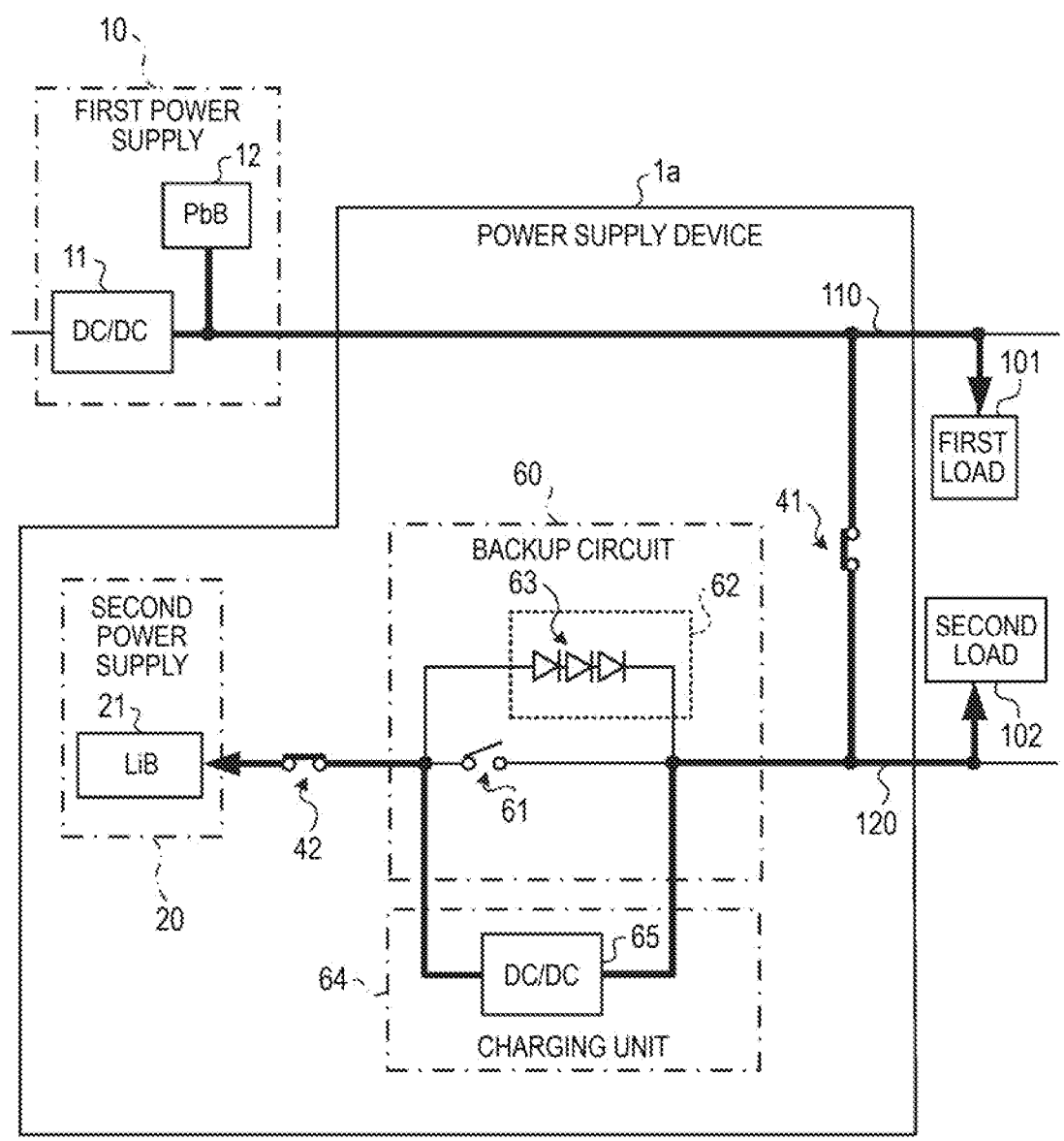
FIG. 7 is an explanatory view illustrating a configuration example of a power supply device according to a first modification.

As shown in FIG. 7, a charging unit 64 includes a DC-to-DC converter (hereinafter, referred to as the "DC/DC 65") for lowering the voltage of the first power supply 10 to charge the second power supply 20. However, the charging unit 64 may be configured to include a voltage lowering circuit other than the DC/DC 65.

The power supply device 1a is different from the power supply device 1 in that it further includes the charging unit 64. The controller of the power supply device 1a performs control on the ON/OFF states of the inter-system switch 41, the battery switch 42, and the regulation switch 61, and control on the DC/DC 65.

The controller of the power supply device 1a performs the same operation as the operation of the controller 3 of the power supply device 1, except when charging the second power supply 20. In a case where the voltage value of the LiB 21 becomes lower than lower limit of a voltage value at which a backup operation is possible, and the controller of the power supply device 1a determines that it is impossible to complete a predetermined backup operation by supplying power from the second power supply 20 to the second load 102, the controller drives the DC/DC 65 to start charging of the second power supply 20.

At this time, the power supply device 1a keeps the inter-system switch 41 and the battery switch 42 in the ON state, and keeps the regulation switch 61 in the OFF state, as in the normal operation. Therefore, it is possible to charge the second power supply 20 through the DC/DC 65 while keeping supplying power from the first power supply 10 to the first load 101 and the second load 102. Further, the power supply device 1a prevents the voltage of the first power supply 10 from being applied directly to the second power supply 20, by the discharge regulation unit 62, thereby capable of preventing the second power supply 20 from being overcharged. Thereafter, when the voltage of the LIB 21 becomes equal to or higher than the charge threshold, the controller of the power supply device 1a stops driving the DC/DC 65 to end the charging of the second power supply 20.

According to the power supply device 1a, for example, when the number of battery cells in the LiB 21 of the power supply device 1a is smaller than the number of battery cells in the LiB 21 of the power supply device 1, and charging with a voltage lower than the voltage of the first power supply 10 is required, it is possible to safely charge the second power supply 20.

Further, according to the power supply device 1a, for example, in the case of a vehicle requiring a relatively small amount of power consumption for backup control during a power supply fault, it is possible to use a low-capacity LiB 21 having a smaller number of battery cells, thereby capable of reducing the cost.

[8. Configuration of Power Supply Device According to Second Modification]

Now, a power supply device 1b according to a second modification will be described with reference to FIG. 8. Herein, of the components shown in FIG. 8, components identical to the components shown in FIG. 1 are denoted by the same reference symbols as the reference symbols shown in FIG. 1, and a repetitive description thereof will not be made.

Figure 8:
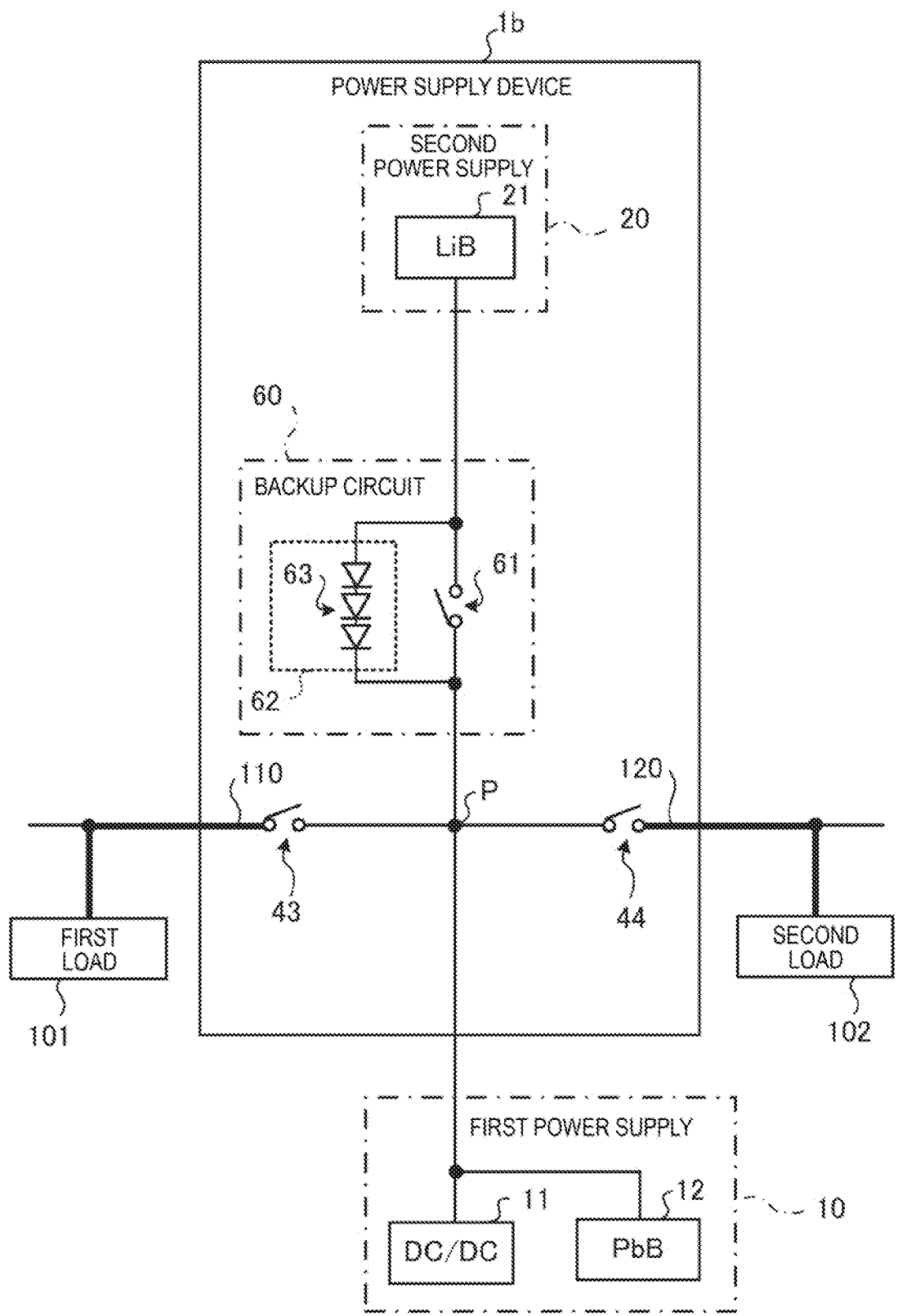
FIG. 8 is an explanatory view illustrating a configuration example of a power supply device according to a second modification.

As shown in FIG. 8, the power supply device 1b is connected to a first power supply 10, a first load 101, and a second load 102. The power supply device 1b includes a first system 110 which is connected to the first load 101, and a second system 120 which is connected to the second load 102.

Also, the power supply device 1b includes a second power supply 20, a backup circuit 60, a first cutoff switch 43, and a second cutoff switch 44. The backup circuit 60 has the same configuration as that of the backup circuit 60 shown in FIG. 1, and is connected between the second power supply 20 and the first power supply 10.

The first cutoff switch 43 is connected so as to be able to connect and disconnect the first system 110 and a middle point P of a wiring line connecting the backup circuit 60 and the first power supply 10 to and from each other. The second cutoff switch 44 is connected so as to be able to connect and disconnect the middle point P and the second system 120. A controller of the power supply device 1b performs control on the ON/OFF states of the regulation switch 61, the first cutoff switch 43, and the second cutoff switch 44.

[9. Normal Operation of Power Supply Device According to Second Modification]

Figure 9:
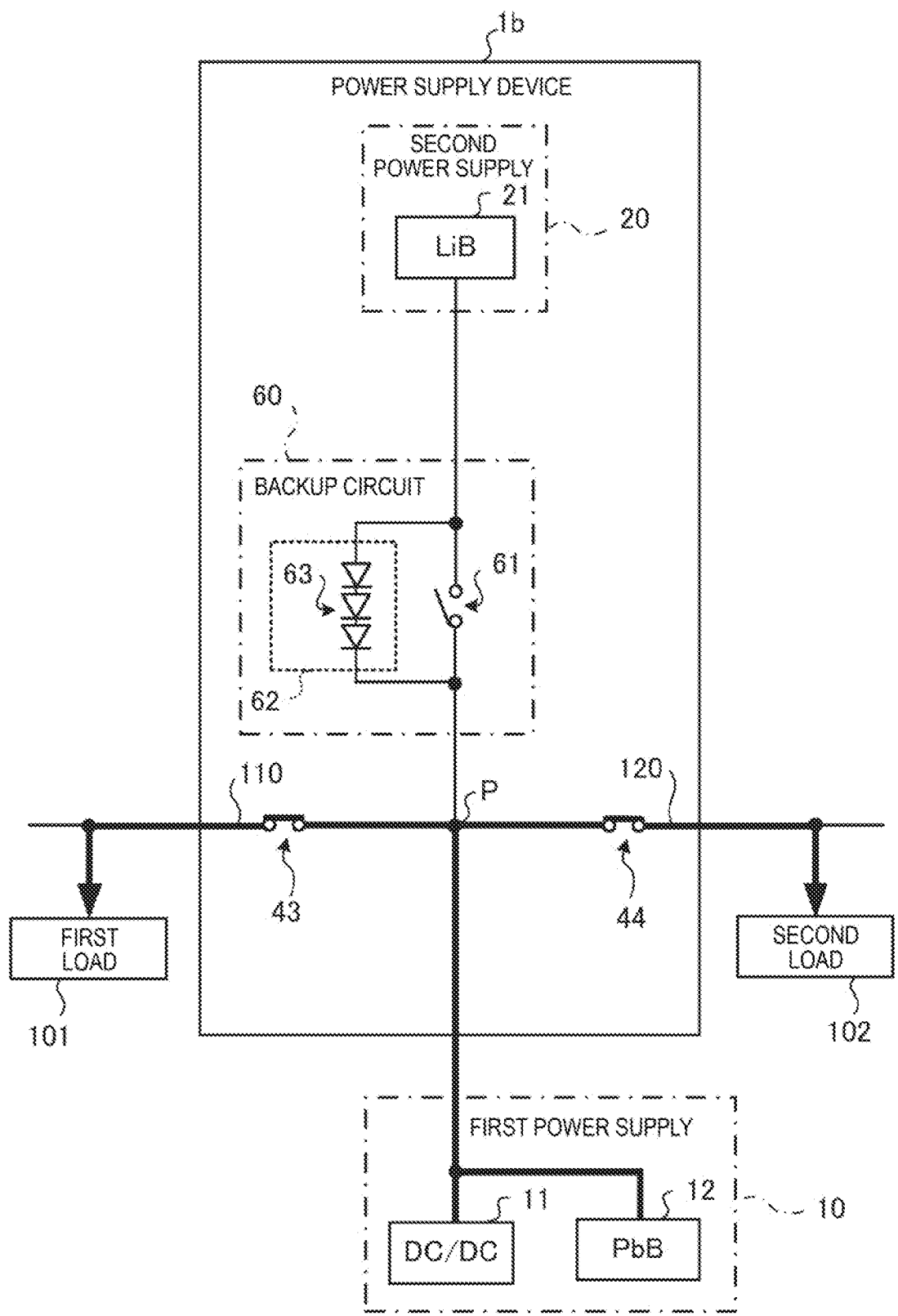
FIG. 9 is an explanatory view illustrating an operation example of the power supply device according to the second modification.

Now, the normal operation of the power supply device 1b according to the second modification will be described with reference to FIG. 9. In normal states when there is no power supply fault such as a ground fault in the first system 110 and the second system 120, as shown in FIG. 9, the controller of the power supply device 1b keeps the regulation switch 61 in the OFF state, and keeps the first cutoff switch 43 and the second cutoff switch 44 in the ON state.

Therefore, the power supply device 1b supplies power from the first power supply 10 to the first load 101 and the second load 102. At this time, discharging of the second power supply 20 is restricted by the discharge regulation unit 62 of the backup circuit 60.

Therefore, in the power supply device 1b, the second power supply 20 is not discharged unless the voltage of the cathode of the discharge regulation unit 62 becomes lower than the voltage of the second power supply 20 by the voltage corresponding to the diode drops, or more. Therefore, it is possible to prevent the second power supply 20 from being discharged unnecessarily during the normal operation.

[10. Operation of Power Supply Device According to Second Modification During First-System Ground Fault]

Figure 10:
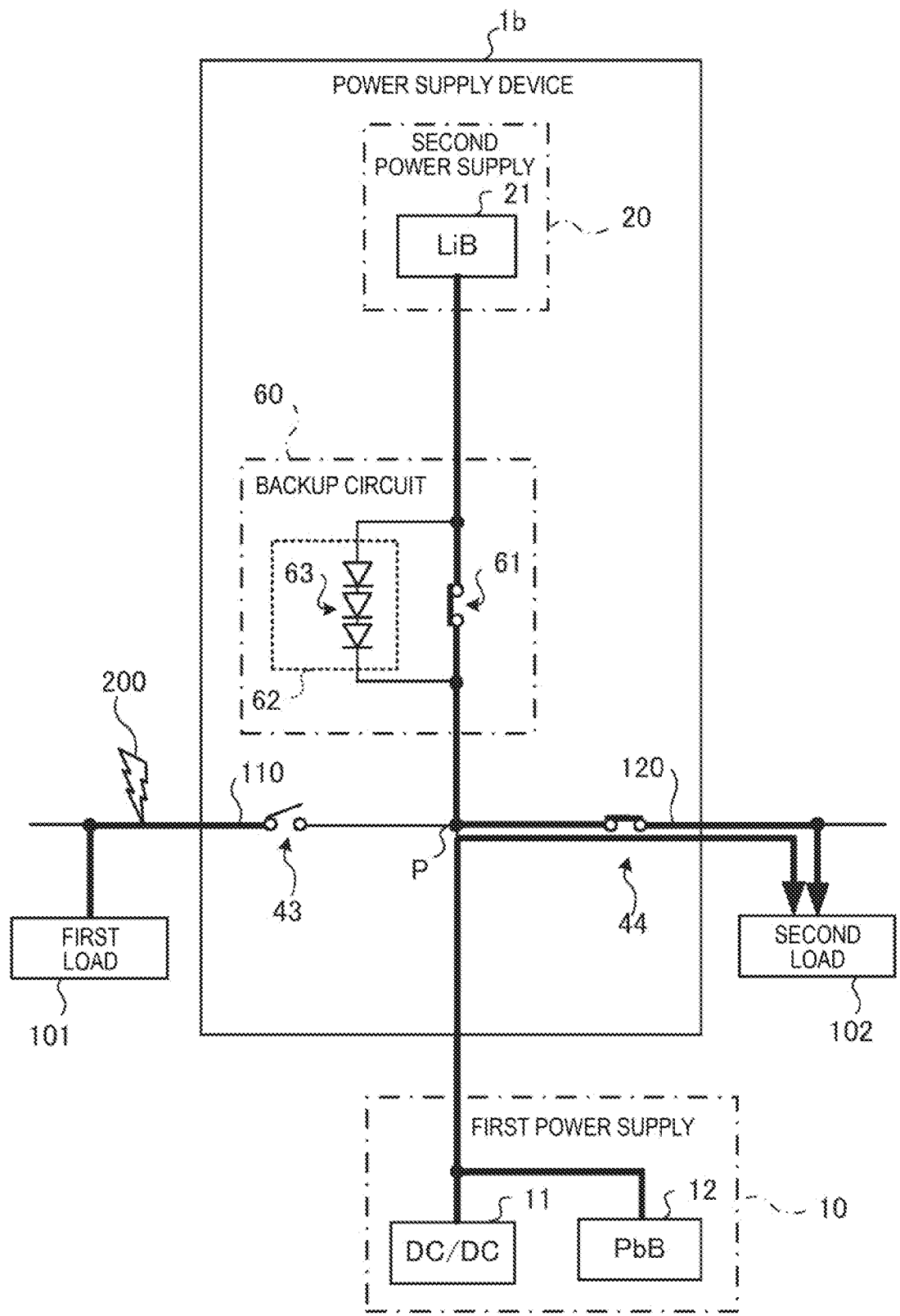
FIG. 10 is an explanatory view illustrating another operation example of the power supply device according to the second modification.

Now, the operation of the power supply device 1b according to the second modification during a first-system ground fault will be described with reference to FIG. 10. In a case where any ground fault 200 occurs in the first system 110, the controller of the power supply device 1b turns off the first cutoff switch 43, and turns on the regulation switch 61, as shown in FIG. 10.

Here, in a case where a ground fault 200 occurs in the first system 110, until the first cutoff switch 43 is turned off, current flows from the first power supply 10 to the ground fault point, whereby the voltage of the second load 102 drops.

At this time, even from the second power supply 20, current flows to the ground fault point through the diodes 63. However, until a voltage drop corresponding to the diodes 63 occurs, current does not flow to the ground fault point through the diodes 63. Therefore, the voltage of the first power supply 10 drops faster than the voltage of the second power supply 20 does.

Therefore, in a case where a ground fault 200 is detected and the first cutoff switch 43 is turned off, since the regulation switch 61 is in the OFF state at that moment, power is supplied from the first power supply 10 to the second load 102, but the voltage of the first power supply 10 may be lower than a voltage required to drive the second load 102.

However, in the power supply device 1b, in a case where the voltage of the first power supply 10 becomes lower than the voltage of the cathode of the discharge regulation unit 62 before the first cutoff switch 43 is turned off, it is possible to instantaneously supply power from the second power supply 20 to the second load 102 through the diodes 63.

At this time, the power which is supplied to the second load 102 is ensured to be power required for the operation of the second load 102, or more while the voltage becomes lower than the voltage of the second power supply 20 by a voltage corresponding to the diodes 63. Thereafter, the controller of the power supply device 1b turns on the regulation switch 61, thereby supplying a larger amount of power to the second load 102.

[11. Operation of Power Supply Device According to Second Modification During Second-System Ground Fault]

Figure 11:
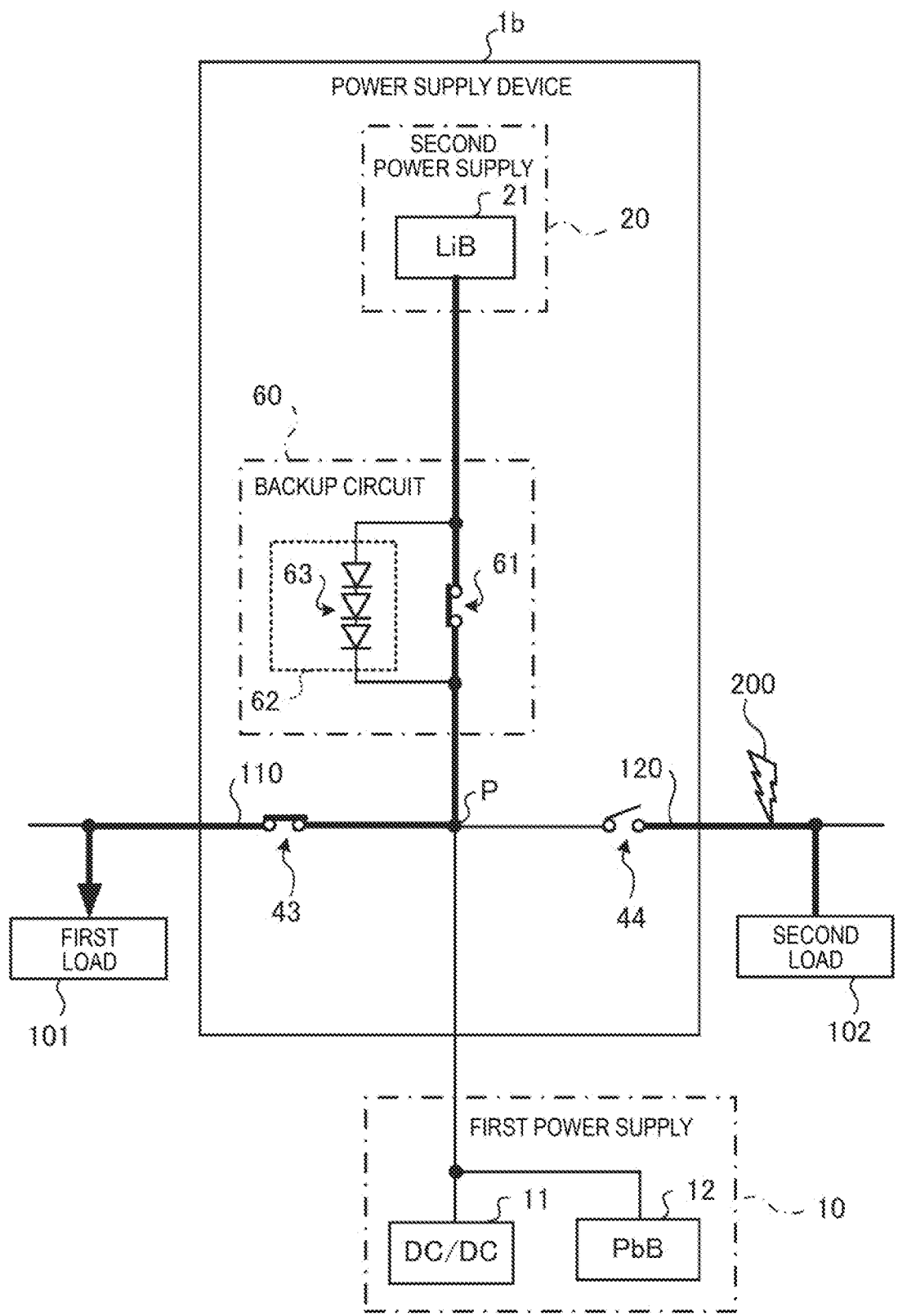
FIG. 11 is an explanatory view illustrating another operation example of the power supply device according to the second modification.

Now, the operation of the power supply device 1b according to the second modification during a second-system ground fault will be described with reference to FIG. 11. In a case where any ground fault 200 occurs in the second system 120, the controller of the power supply device 1b turns off the second cutoff switch 44, and turns on the regulation switch 61, as shown in FIG. 11.

Here, in a case where a ground fault 200 occurs in the second system 120, until the second cutoff switch 44 is turned off, current flows from the first power supply 10 to the ground fault point, whereby the voltage of the first load 101 drops.

At this time, even from the second power supply 20, current flows to the ground fault point through the diodes 63. However, until a voltage drop corresponding to the diodes 63 occurs, current does not flow to the ground fault point through the diodes 63. Therefore, the voltage of the first power supply 10 drops faster than the voltage of the second power supply 20 does.

Therefore, when detecting a ground fault 200 and turning off the second cutoff switch 44, since the regulation switch 61 is in the OFF state at that moment, power is supplied from the first power supply 10 to the first load 101, but the voltage of the first power supply 10 may be lower than a voltage required to drive the first load 101.

However, in the power supply device 1b, when the voltage of the first power supply 10 becomes lower than the voltage of the cathode of the discharge regulation unit 62 before the second cutoff switch 44 is turned off, it is possible to instantaneously supply power from the second power supply 20 to the first load 101 through the diodes 63.

At this time, the power which is supplied to the first load 101 is ensured to be power required for the operation of the first load 101, or more while the voltage becomes lower than the voltage of the second power supply 20 by a voltage corresponding to the diodes 63. Thereafter, the controller of the power supply device 1b turns on the regulation switch 61, thereby supplying a larger amount of power to the first load 101.

[12. Operation of Power Supply Device According to Second Modification During Charging]

Figure 12:
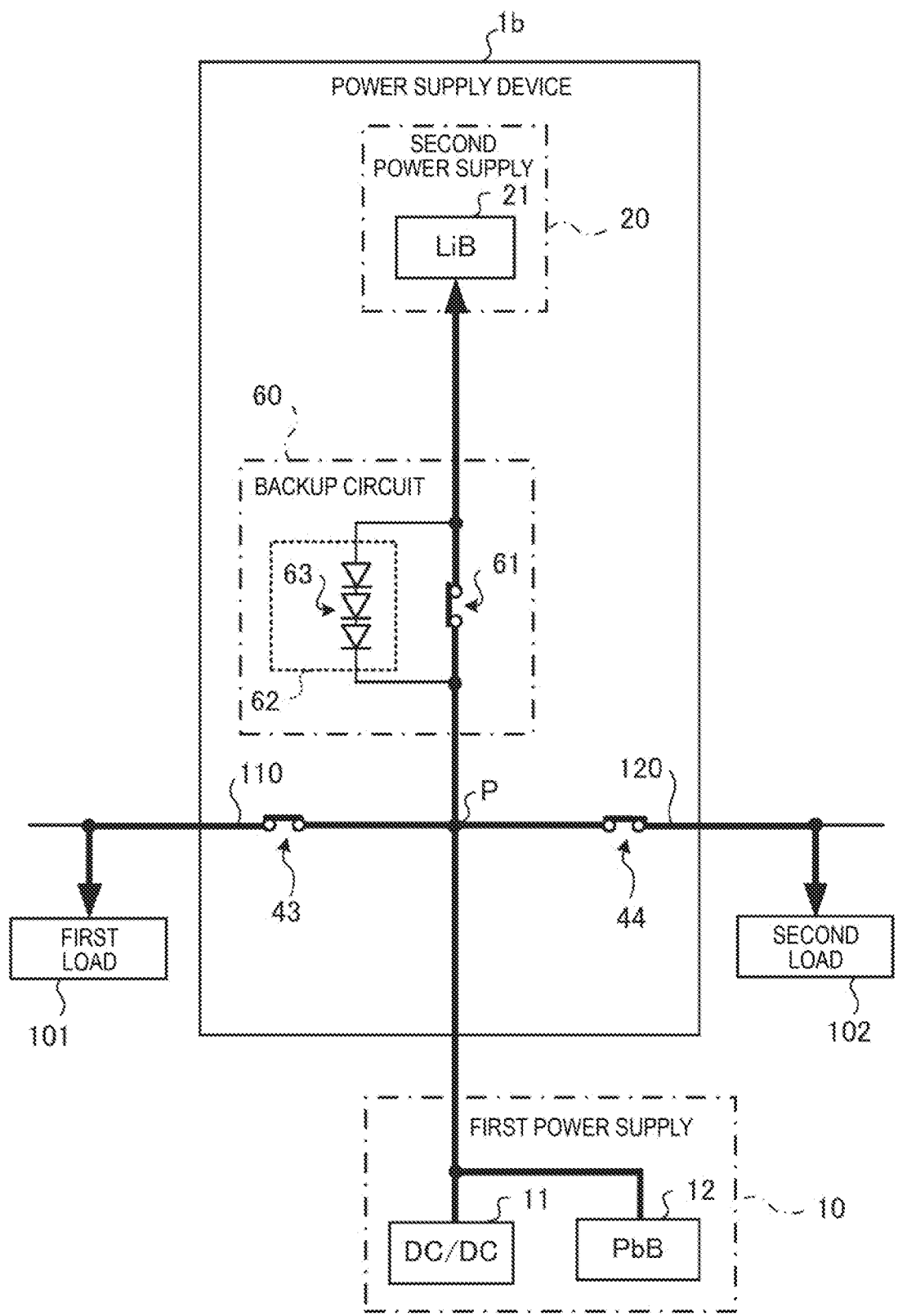
FIG. 12 is an explanatory view illustrating another operation example of the power supply device according to the second modification.

Now, the operation of the power supply device 1b according to the second modification during charging will be described with reference to FIG. 12. When the voltage of the LiB 21 becomes lower than the charge threshold during the normal operation, the controller of the power supply device 1b turns on the regulation switch 61 as shown in FIG. 12. At this time, the inter-system switch 41 and the battery switch 42 are kept in the conductive state.

As a result, while keeping supplying power from the first power supply 10 to the first load 101 and the second load 102, the power supply device 1b can supply power from the first power supply 10 to the LiB 21 through the regulation switch 61 to charge the second power supply 20.

Also, according to the power supply device 1b, it is possible to charge the second power supply 20 in a case where the voltage of the second power supply 20 drops while preventing the second power supply 20 from being discharged unnecessarily by the diodes 63 of the discharge regulation unit 62 during the normal operation. Thereafter, in a case where the voltage value of the LiB 21 becomes equal to or larger than the charge threshold, the controller of the power supply device 1b turns off the regulation switch 61, thereby ending the charging of the second power supply 20, and returns to the normal operation.

[13. Processing which is Performed by Controller of Power Supply Device According to Second Modification]

Now, processing which is performed by the controller of the power supply device 1b according to the second modification will be described with reference to FIG. 13. The controller of the power supply device 1b repeatedly performs the processing shown in FIG. 6 while power is supplied to the vehicle.

Figure 13:
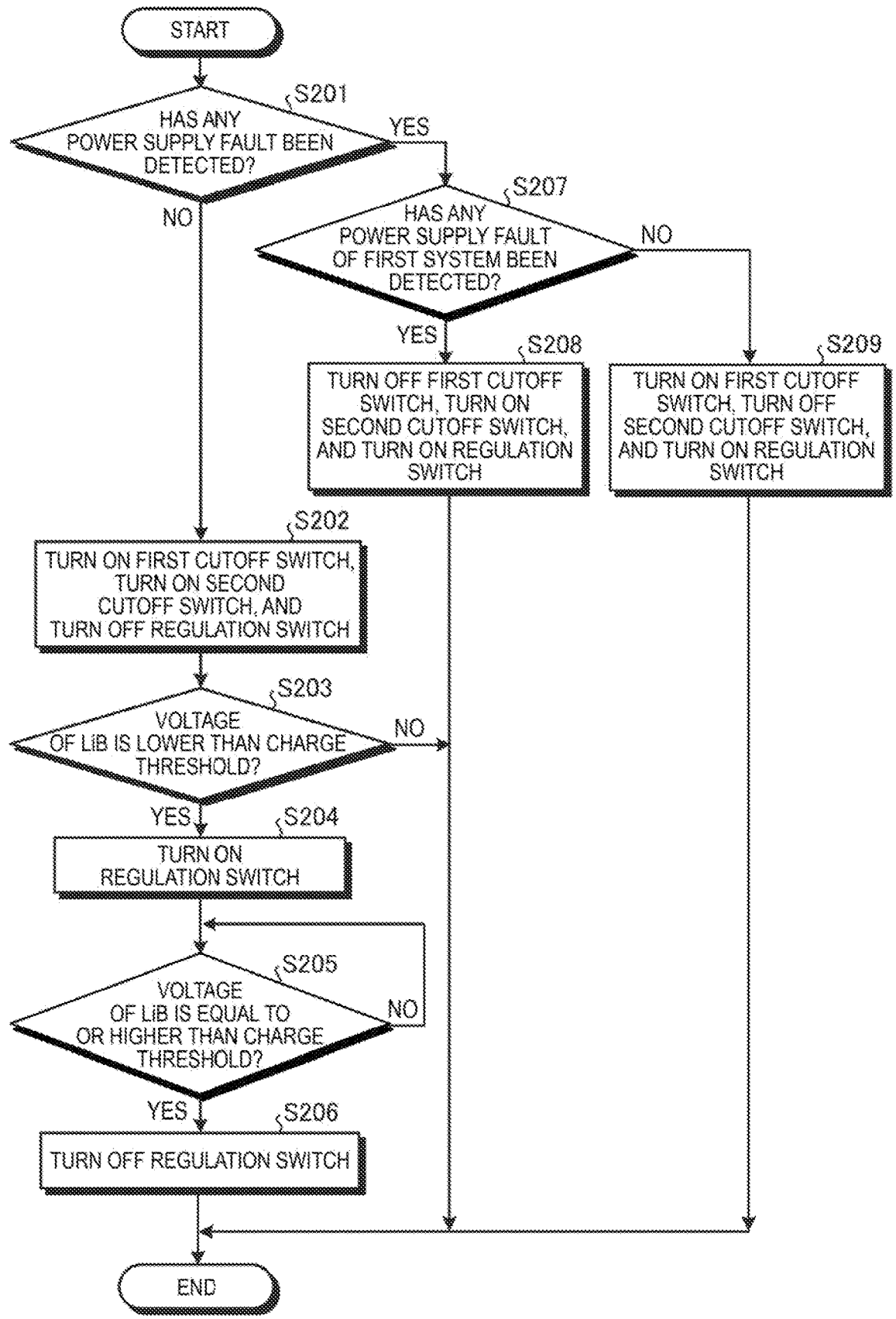
FIG. 13 is an explanatory view illustrating a configuration example of a power supply device according to a third modification.

As shown in FIG. 13, first, the controller of the power supply device 1b determines whether any power supply fault has been detected or not (STEP S201). When determining that any power supply fault has been detected ("Yes" in STEP S201), the controller of the power supply device 1b determines whether any power supply fault of the first system 110 has been detected (STEP S207).

When determining that a power supply fault of the first system 110 has been detected ("Yes" in STEP S207), the controller of the power supply device 1b turns off the first cutoff switch 43, turns on the second cutoff switch 44, turns on the regulation switch 61 (STEP S208), and ends the processing. Then, the controller of the power supply device 1b restarts the processing from STEP S201.

Meanwhile, when determining that any power supply fault of the first system 110 has not been detected ("No" in STEP S207), since it is a fault of the second system 120, the controller of the power supply device 1b turns on the first cutoff switch 43, turns off the second cutoff switch 44, turns on the regulation switch 61 (STEP S209), and ends the processing. Then, the controller of the power supply device 1b restarts the processing from STEP S201.

Meanwhile, when determining that any power supply fault has not been detected ("No" in STEP S201), the controller of the power supply device 1b turns on the first cutoff switch 43, turns on the second cutoff switch 44, and turns off the regulation switch 61 (STEP S202).

Subsequently, the controller of the power supply device 1b determines whether the voltage of the LiB 21 is lower than the charge threshold or not (STEP S203). When determining that the voltage of the LiB 21 is not lower than the charge threshold ("No" in STEP S203), the controller of the power supply device 1b ends the processing. Then, the controller of the power supply device 1b restarts the processing from STEP S201.

Meanwhile, when determining that the voltage of the LiB 21 is lower than the charge threshold ("Yes" in STEP S203), the controller of the power supply device 1b turns on the regulation switch 61 (STEP S204) to start charging of the LiB 21.

Subsequently, the controller of the power supply device 1b determines whether the voltage of the LiB 21 has become equal to or higher than the charge threshold, or not (STEP S205). When determining that the voltage of the LiB 21 has not become equal to or higher than the charge threshold ("No" in STEP S205), the controller of the power supply device 1b repeats the determining process of STEP S205 until the voltage of the LiB 21 becomes equal to or higher than the charge threshold.

Then, when determining that the voltage of the LiB 21 has become equal to or higher than the charge threshold ("Yes" in STEP S205), the controller of the power supply device 1b turns off the regulation switch 61 (STEP S206), and ends the processing. Then, the controller of the power supply device 1b restarts the processing from STEP S201.

[14. Configuration of Power Supply Device According to Third Modification]

Now, a power supply device 1c according to a third modification will be described with reference to FIG. 14. Herein, of the components shown in FIG. 14, components identical to the components shown in FIG. 8 are denoted by the same reference symbols as the reference symbols shown in FIG. 8, and a repetitive description thereof will not be made.

Figure 14:
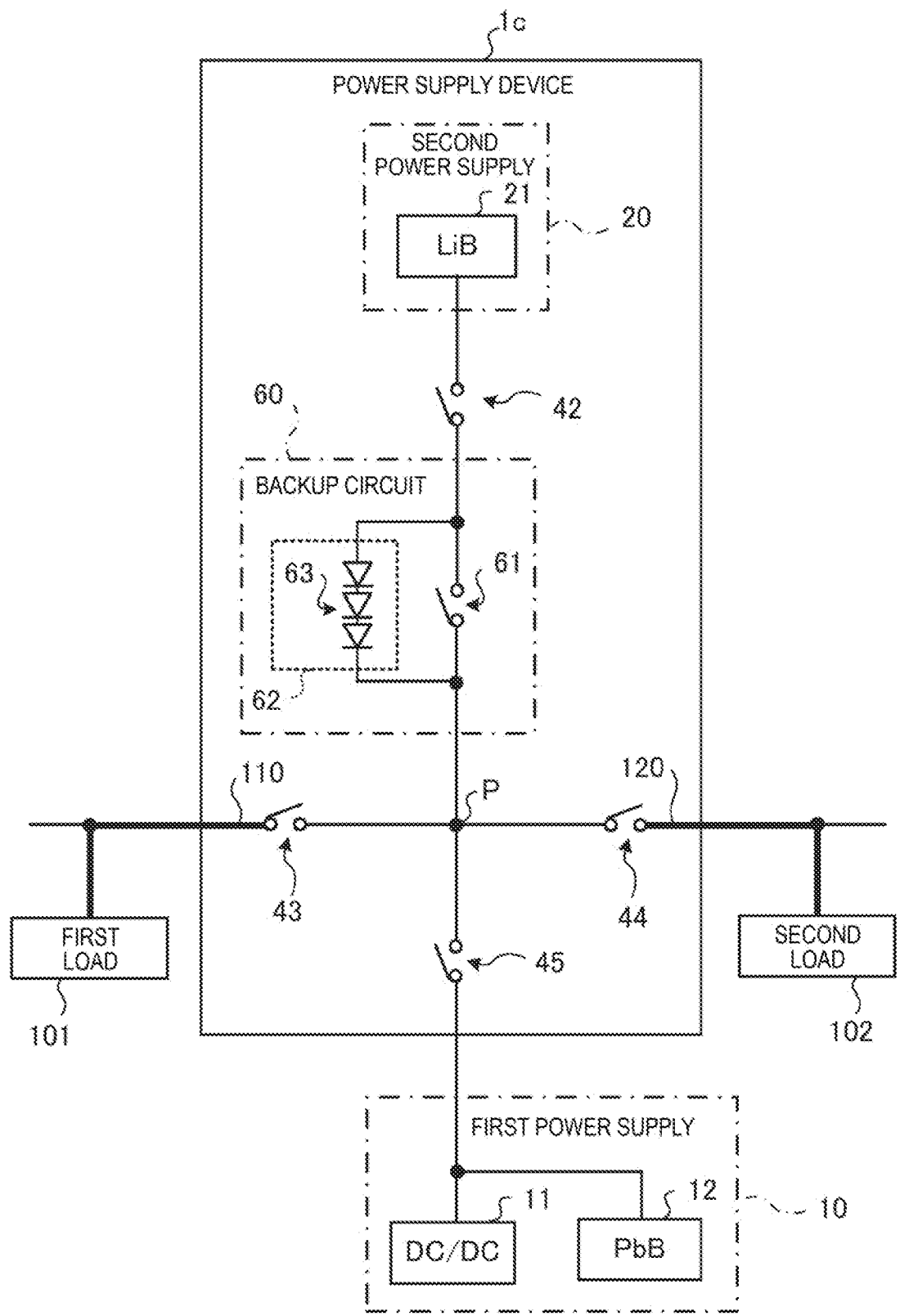
FIG. 14 is a flow chart illustrating an example of processing which is performed by a controller of the power supply device according to the third modification.

As shown in FIG. 14, the power supply device 1c further includes a battery switch 42 and a switch 45 for the first power supply in addition to the components included in the power supply device 1b shown in FIG. 8. The controller of the power supply device 1c performs control on the ON/OFF states of the battery switch 42, the regulation switch 61, the first cutoff switch 43, the second cutoff switch 44, and the switch 45 for the first power supply.

During the normal operation, the controller of the power supply device 1c keeps the battery switch 42 and the switch 45 for the first power supply in the ON state, and controls the regulation switch 61, the first cutoff switch 43, and the second cutoff switch 44 in the same way as the controller of the power supply device 1b according to the second modification does. Therefore, the power supply device 1c has the same effect as that of the power supply device 1b.

Further, in a case where a ground fault occurs between the battery switch 42 and the second power supply 20, the controller of the power supply device 1c turns off the battery switch 42. Therefore, even when a ground fault occurs at the power output point of the second power supply 20, the power supply device 1c can supply power from the first power supply 10 to the first load 101 and the second load 102.

Furthermore, in a case where a ground fault occurs between the switch 45 for the first power supply and the first power supply 10, the controller of the power supply device 1c turns off the switch 45 for the first power supply. Therefore, even when a ground fault occurs at the power output point of the first power supply 10, the power supply device 1c can supply power from the second power supply 20 to the first load 101 and the second load 102.

By the way, the charging unit 64 according to the first modification may be connected in parallel to the backup circuits 60 according to the second modification and the third modification. Therefore, in the case of a vehicle requiring a relatively small amount of power consumption for backup control during a power supply fault, the power supply device 1b according to the second modification and the power supply device 1c according to the third modification can use a low-capacity LiB 21 having a smaller number of battery cells, thereby capable of reducing the cost.

Various advantages and modifications can be easily achieved by those skilled in the art. Therefore, the invention in its broader aspects is not limited to the specific details and representative embodiments shown and described above. Accordingly, various modifications may be made without departing from the spirit or scope of the general inventive concept as defined by the appended claims and their equivalents.

What is claimed is:

1. A power supply device comprising:
    a first system connected to a first load;
    a second system connected to a second load;
    an inter-system switch configured to connect and disconnect the first system and the second system to and from each other;
    a controller configured to normally supply power of a first power supply to the first system and the second system and, in response to a fault of the first system being detected, turn off the inter-system switch to supply power of a second power supply to the second system; and
    a backup circuit which includes a discharge regulation unit configured to regulate discharging of the second power supply during a normal state in which the inter-system switch connects the first and second systems to each other, the discharge regulation unit preventing discharge of the second power supply during the normal state by being non-conductive when voltages of the first and second power supplies are equal to each other, and the discharge regulation unit allowing discharge of the second power supply by becoming conductive when the voltage of the first power supply becomes lower than the voltage of the second power supply by a predetermined value greater than 0 or more.

2. The power supply device according to claim 1, wherein:
    the backup circuit includes a regulation switch connected in parallel to the discharge regulation unit;
    the controller normally turns off the regulation switch; and
    in a case where the inter-system switch is turned off in response to the fault of the first system being detected, the controller turns on the regulation switch.

3. The power supply device according to claim 2, wherein the controller turns on the regulation switch to charge the second power supply with the first power supply.

4. The power supply device according to claim 1, further comprising
    a charging unit connected in parallel to the backup circuit and configured to lower the voltage of the first power supply to charge the second power supply.

5. The power supply device according to claim 2, further comprising
    a charging unit connected in parallel to the backup circuit and configured to lower the voltage of the first power supply to charge the second power supply.

6. The power supply device according to claim 3, further comprising
    a charging unit connected in parallel to the backup circuit and configured to lower the voltage of the first power supply to charge the second power supply.

7. A control method of a power supply device including a first system connected to a first load, a second system connected to a second load, an inter-system switch configured to connect and disconnect the first system and the second system to and from each other, and a controller configured to normally supply power of a first power supply to the first system and the second system, the control method comprising:
    in response to a fault of the first system being detected, turning off the inter-system switch by the controller to supply power from a second power supply to the second system through a backup circuit including a discharge regulation unit configured to regulate discharging of the second power supply, wherein the discharge regulation unit:
    regulates the discharging of the second power supply during a normal state in which the inter-system switch connects the first and second systems to each other;
    prevents discharge of the second power supply during the normal state by being non-conductive when voltages of the first and second power supplies are equal to each other; and
    allows discharge of the second power supply by becoming conductive when the voltage of the first power supply becomes lower than the voltage of the second power supply by a predetermined value greater than 0 or more.

* * * * *